(12) United States Patent
Chiang et al.

(10) Patent No.: US 7,953,286 B2
(45) Date of Patent: May 31, 2011

(54) AUTOMATIC CONTRAST ENHANCEMENT

(75) Inventors: Patricia Wei Yin Chiang, Singapore (SG); Yau Wai Hui, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 966 days.

(21) Appl. No.: 11/890,606

(22) Filed: Aug. 7, 2007

(65) Prior Publication Data

US 2008/0037897 A1   Feb. 14, 2008

(30) Foreign Application Priority Data

Aug. 8, 2006   (SG) .............................. 200605450-6

(51) Int. Cl.
*G06K 9/00*   (2006.01)
*G06K 9/40*   (2006.01)
*G06K 9/38*   (2006.01)
*G03F 3/08*   (2006.01)

(52) U.S. Cl. ......... 382/254; 382/168; 382/273; 358/522

(58) Field of Classification Search .................. 382/168, 382/172, 254, 263–270, 273–275, 312; 358/521–522, 532
See application file for complete search history.

(56) References Cited

U.S. PATENT DOCUMENTS

| 4,868,651 | A | | 9/1989 | Chou et al. | |
| 5,052,077 | A | * | 10/1991 | Lautenschlager et al. | 16/238 |
| 5,426,517 | A | | 6/1995 | Schwartz | |
| 5,848,183 | A | * | 12/1998 | Farrell | 382/172 |
| 5,881,166 | A | * | 3/1999 | Farrell | 382/168 |
| 6,694,051 | B1 | | 2/2004 | Yamazoe et al. | |
| 6,826,310 | B2 | * | 11/2004 | Trifonov et al. | 382/274 |
| 7,003,153 | B1 | | 2/2006 | Kerofsky | |
| 7,058,220 | B2 | * | 6/2006 | Obrador | 382/168 |
| 7,319,787 | B2 | * | 1/2008 | Trifonov et al. | 382/168 |
| 7,593,591 | B2 | * | 9/2009 | Achong et al. | 382/274 |

FOREIGN PATENT DOCUMENTS

| DE | 197 35 130 A1 | 2/1998 |
| EP | 0383269 | 8/1990 |
| EP | 0 856 813 A2 | 8/1998 |
| EP | 0856813 | 8/1998 |

OTHER PUBLICATIONS

Pizer, et al., "Adaptive Histogram Equalization and its Variations," Computer Vision Graphics and Image Processing, Academic Press, Duluth, MA, US, vol. 39, No. 3, Sep. 1987, pp. 355-368, XP001002914.
European Search Report and Written Opinion, EP 07 25 3086, dated Oct. 16, 2007.
Austrian Search Report for Application Serial No. 200605450-6, mailing date of Mar. 23, 2009 (8 Pages).

* cited by examiner

*Primary Examiner* — Kanji Patel
(74) *Attorney, Agent, or Firm* — Lisa K. Jorgenson; Andre M. Szuwalski

(57) ABSTRACT

In a process for enhancing contrast of an image having pixels in different brightness intensities, a histogram in discrete bins is generated. Each bin represents a pixel population of at least one pixel brightness intensity. A peak and a peak region of the histogram is then identified, wherein the peak region is a range of discrete bins around the peak. An average pixel population within the peak region is computed, and the pixel populations of the discrete bins within the peak region that exceeds the average pixel population are distributed. A transfer curve for mapping onto the image is then generated. The process can be used in an image processor for enhancing contrast of an image having pixel. Still further, a display having a receiver and a screen can include the foregoing image processor.

43 Claims, 9 Drawing Sheets

AUTOMATIC CONTRAST ENHANCEMENT

PRIORITY CLAIM

This application claims priority from Singapore Application No. 200605450-6 of the same title filed Aug. 8, 2006, the disclosure of which is hereby incorporated by reference.

FIELD OF THE INVENTION

The present invention generally relates to image processing technologies and, more particularly, to video and image processing devices and processes for automatic contrast enhancement during video and/or image processing.

BACKGROUND OF THE INVENTION

In the context of digital image processing, a clear image would generally mean that features of the image can clearly be identified or interpreted. Contrast enhancement is typically used for improving the interpretation of features of an image. However, as opposed to other imaging controls, such as exposure control, the control of contrast is difficult due to its nonlinear transform function characteristic.

Histogram modification is often called for in contrast enhancement of an image. A histogram of an image provides pixel intensity of brightness for analyzing the lightness or darkness characteristic of the image. The histogram is a graph showing population of pixels at each grayscale value within the image. For an 8-bit grayscale image, for example, there are 256 different possible intensities, and thus, the histogram of that 8-bit image may show pixel distributions amongst the 256 levels of grayscale values. Similarly, for color images, the histogram may be provided by three individual histograms of red, green and blue channels.

Depending upon the implementation, the output of a processed histogram may be a processed image of the histogram, or a data file representing the histogram statistics.

Before natural video from a broadcast, video CD and DVD source is displayed at the consumer end on a TV or other display device, the video can undergo several non-linear processes that include analog to digital and digital to analog conversions, sensor circuitry, transmission attenuation and amplification, and digital encoding and decoding. As a result, the dynamics of the video frames/streams are distorted and the visual quality of the picture in terms of contrast is reduced. Thus, there is a need to reverse the changes and restore visual attractiveness.

One common method is to provide an adjustable contrast feature on a display device, where the adjustable contrast feature allows manual adjustment of the contrast by stretching the dynamic range of the video with clamping at black level. Problems with this method are that the contrast adjustment is manual so as not be able to adapt to the nature of the source, and that the dynamic stretching characteristics are fixed so as not be suitable for all pictures.

Histogram equalization is a method employed in image processing to improve the contrast of images by flattening the distribution density in the histogram of an image. However, such a method targets an output at middle gray level regardless of the brightness of the input image, which makes dark images too bright with a white-wash effect and bright pictures too dark or overly contrasted, such that the enhancement makes the picture unnatural or the interpretation of image content is altered. This brings about serious consequences in motion images, i.e. video, when a day scene moves to a night scene and vice versa.

It is known to use a dual segment transfer function with a lower segment gain adjusted by dark sample distribution, an upper segment gain adjusted by frame or field peak, and an adaptive pivot point that separates the two segments adjusted by the image brightness.

Further, there is known a contrast enhancement transform made up of two independent transform functions, one with levels less or equal to mean level and the other with levels greater or equal to the mean. In addition, the individual transform functions are constructed in dependence on the distribution of samples in their respective regions.

The above two methods perform picture and histogram analysis and adjust contrast gain automatically according to parameters not limited to but including picture brightness, sample distribution, frame/field peak. However, these methods have a limitation on correcting over-contrasted pictures.

FIG. 11 shows an existing contrast improvement method by gathering pictures of sequence into histogram, equalizing histogram class peaks by redistributing histogram values above pre-determined limit to neighboring class, temporally filtering processed histogram recursively to preserve edges, and transforming the histogram to mapping function for altering picture contrast. See, Nenonen, EP 0856813.

There is yet another image enhancement method by obtaining the histogram of a picture with quantized input pixel values, calculating the cumulative density function, and interpolating the latter as a transform function. The method further describes the control of the transform function such that the mean level of the histogram can be mapped to itself.

These two methods retain the mean brightness of the picture by controlling the transform function such that the mean brightness mapped onto itself. The mean brightness is sometimes not the same as the perceived brightness. The change in overall brightness impression is acceptable in still pictures but in video sequences with fading transitions there might be an inversion in the lighting condition in consecutive pictures.

The histogram processing techniques suffer from over-compensating contrast such that some mid-contrasted pictures may become over-contrasted after contrast enhancement. The cumulative density function may result in steep slopes on the transfer curve that produces artifacts including a relatively unrealistic picture with the extremes of dark and bright and bright loss of desirable details as a result of that over-stretched contrast, and unnatural picture with over-expansion of undesired details as a result of overstretching of certain gray levels.

In addition, in pictures with good contrast and a large portion of near black/white background, good contrasted features may be compressed. Picture blurring may occur as a result of reduced gray level difference between a dominant region and neighboring minor regions from the compression of certain gray level ranges.

Last but not least, temporal consistency can sometimes be a problem in contrast enhancement with automatic gain control. Slight changes in pictures may have different contrast enhancement effects and this may cause flicker in moving pictures. Solutions like recursive temporal filtering in one of the above methods reduce the flicker but do not respond to scene change in video sequences.

BRIEF DESCRIPTION OF THE DRAWINGS

Preferred embodiments according to the present invention will now be described with reference to the Figures, in which like reference numerals denote like elements.

DETAILED DESCRIPTION OF THE DRAWINGS

Figure 1:
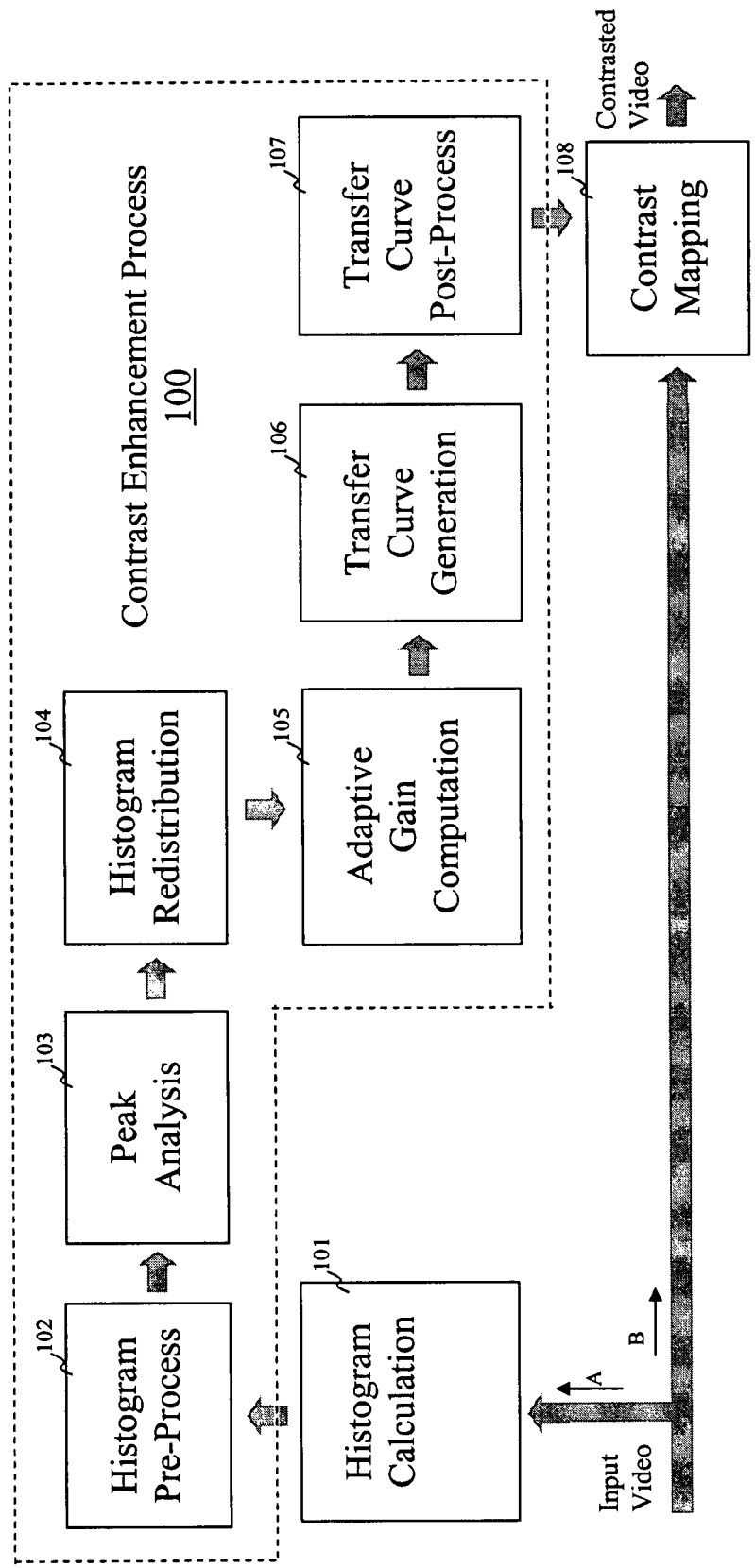
FIG. 1 shows a schematic block diagram of contrast enhancement processing in accordance with one embodiment of the present invention.

The present invention overcomes the above limitations and drawbacks of contrast enhancement techniques. It enhances the contrast of pictures, restores visual attractiveness of video and preserves the naturalness of scenes by providing a peak-preserving automatic contrast enhancement technique.

In one embodiment, there is provided, a process for enhancing contrast of an image having pixels in different brightness intensities, the process comprises generating a histogram in discrete bins, each bin representing a pixel population of at least one pixel brightness intensity; identifying a peak and a peak region of the histogram, wherein the peak region is a range of discrete bins around the peak; computing an average pixel population within the peak region; distributing the pixel populations of the discrete bins within the peak region that exceeds the average pixel population; and generating a transfer curve for mapping onto the image.

It is preferred that the process of contrast enhancement further comprises expanding the histogram to provide $2^n$ discrete bins when the generated histogram has a number of discrete bins less than $2^n$, where n is number of bits of the image. The process may also filter the histogram with a smoothing filter for avoiding discontinuities of pixel population between successive discrete bins. An adaptive gain may be computed based on the peak, the peak region and the average pixel population during the contrast enhancement process.

In accordance with the above embodiment, the generated histogram may also include $2^n$ discrete bins, where n is number of bits of the image and the histogram may be provided based on an active window of the image. Preferably, the peak, the peak region, and the peak density are identified based on the filtered histogram. Also, the transfer curve may comprise two opposing banded curves separated by a pivot point that corresponds to the peak. It is also preferred that, the peak region comprise continuous discrete bins having pixel population higher than a histogram average, wherein the histogram average is an average of a total pixel population over the number of discrete bins.

Alternatively, the smoothing filter may comprise smoothing factors, and wherein the smoothing filter provides relatively higher smoothing factors at mid level pixel intensities than that of high and low pixel intensities. It is also preferred that the smoothing filter further comprises a smearing parameter for de-emphasizing the histogram.

It is also preferred that, while distributing the pixel populations, the pixel populations which exceed the average pixel population are distributed along two sides of the peak. The distribution may occur within the peak region, and overflows when the distribution of the pixel population reaches boundaries of the peak region are truncated.

In accordance with an embodiment, the contrast enhancement may be used on a video comprising video frames of images. Accordingly, the process may further comprise computing a sum of absolute difference (SAD) of the histogram of a current image based on a previous image; and performing a SAD weighted recursive temporal filtering to the histogram. It is also preferred that the process comprise computing a SAD of a transfer curve; and performing a SAD weighted recursive temporal filtering on the transfer curve.

In another embodiment, there is provided an image processor for enhancing contrast of an image having pixels comprises a histogram generator for generating a histogram in discrete bins, each bin representing a pixel population of at least one pixel brightness intensity; a peak analyzer for identifying a peak, a peak region and an average pixel population of the histogram, wherein the peak region is a range of discrete bins around the peak, and the average pixel population is an average of the pixel population within the peak region; a pixel distributor for distributing the pixel populations of the discrete bins within the peak region that exceeds the average pixel population; and a transfer curve generator for generating a transfer curve for mapping onto the image.

It is preferred that the image processor further expands the histogram to provide $2^n$ discrete bins when the generated histogram has a number of discrete bins less than $2^n$, where n is number of bits of the image. The image processor may further comprise smoothing filter for filtering the histogram to avoid discontinuities of pixel population between successive discrete bins. The image processor may also compute an adaptive gain based on the peak, the peak region and the average pixel population during the contrast enhancement process.

The image processor may generate the histogram with $2^n$ discrete bins, where n is number of bits of the image and the histogram may be provided based on an active window of the image. Preferably, the peak, the peak region, and the peak density are identified based on the filtered histogram. Also, the transfer curve may comprise two opposing banded curves separated by a pivot point that corresponds to the peak. It is also preferred that, the peak region comprise continuous discrete bins having pixel population higher than a histogram average, wherein the histogram average is an average of a total pixel population over the number of discrete bins.

Alternatively, the smoothing filter may comprise smoothing factors, and wherein the smoothing filter provides relatively higher smoothing factors at mid level pixel intensities than that of high and low pixel intensities. It is also preferred that the smoothing filter further comprises a smearing parameter for de-emphasizing the histogram.

It is also preferred that, while distributing the pixel populations, the pixel populations that exceed the average pixel population are distributed along two sides of the peak. The distribution may occur within the peak region, and overflows when the distribution of the pixel population reaches boundaries of the peak region are truncated.

In accordance with an embodiment, the image processor may be used for processing a video comprising video frames of images. Accordingly, the process may further comprises computing a sum of absolute difference (SAD) of the histogram of a current image based on a previous image; and performing a SAD weight recursive temporal filtering to the histogram. It is also preferred that the process comprises computing a SAD of transfer curve; and performing a SAD weighted recursive temporal filtering on the transfer curve.

In yet another embodiment, a display comprises a receiver for receiving input image from image sources; an image processor in accordance with the aforesaid embodiment, a screen for outputting the processed image.

The embodiments may be understood more readily by reference to the following detailed description.

Throughout this application, where publications are referenced, the disclosures of these publications are hereby incorporated by reference, in their entireties, into this application in order to more fully describe the state of art to which this invention pertains.

It is to be appreciated that video and/image processing comprises more than one operation or process. Thus, before being outputted, an input video signal is subjected to a series of processes to enhance the visual qualities of the processed video and/or images.

Referring to FIG. 1, there is provided a schematic block diagram of contrast enhancement processing of an input video in accordance with one embodiment of the present invention. The Contrast Enhancement Process 100 comprises a Histogram Pre-Process 102, Peak Analysis 103, Histogram Redistribution 104, Adaptive Gain Computation 105, Transfer Curve Generation 106, and Transfer Curve Post-Process 107. Briefly, the Histogram Pre-Process 102 filters the histogram temporally to minimize variation in pre-analyzed histogram, and then smoothes the histogram along a gray level axis. Then the Peak Analysis 103 detects from the pre-processed histogram a peak region and extracts a peak density, peak location and peak distribution from the pre-processed histogram. Based on the detected region and the extracts, histogram values in excess of peak density are re-redistributed in the step of the Histogram Redistribution 104. The Adaptive Gain Computation process 105 calculates a contrast gain in accordance with extracted peak density, peak position and peak distribution. The Transfer Curve Generation 106 then computes cumulative density functions and outputs a transfer curve. If desired, the transfer curve may be computed with white and black boost. The Transfer Curve Post-Process 107 then filters the transfer curve temporally to ensure temporal stability in the contrast enhancement process 100.

As also shown in FIG. 1, the Input Video signal when received is channeled into two paths (A and B), where the Video signal in the A path goes through the Histogram Calculation 101 and the Contrast Enhancement Process 100 to generate a specific filtered transfer curve for the input video signal, and then the filtered transfer curve from the A path maps to the video input signal from the B path in the Contrast Mapping 108, resulting in a contrast enhanced video output. In the step of the Histogram Calculation 101, a histogram in a predetermined number of discrete bins is generated based on the input video. Methods of generating the histogram are well known in the art, and any suitable method would be applicable for an appropriate embodiment of the present invention.

Still referring to FIG. 1, the Histogram Calculation 101 and Contrast Mapping 108 are not included in the box of Contrast Enhancing Process 100. Because both Histogram Calculation 101 and Contrast Mapping 108 are pixel-based operations, they require higher operating power. In one embodiment, these operations are preferably operated on a customized hardware or high-speed processors. In contrast, the boxed Contrast Enhancement Process 100 requires less processing time; thus it can be implemented as software on general controllers or system processors. It is to be appreciated that the configuration of the operations is arbitrary, and in the following descriptions all steps 101-108 are considered a series of operations of the Contrast Enhancing Process 100.

Referring now to FIGS. 2-8, there are provided more detailed descriptions of the operations of the Contrast Enhancement Process 100.

In one embodiment, the Histogram Calculation 101 generates the histogram based an active window of the input video; thus any external boundaries of the input video, if present, such as black regions when a wide-screen video is viewing in a letterbox-sized display, are excluded. Each pixel in the active window is scanned and pixel count is performed based on their corresponding grayscale so as to form a histogram of discrete bins. Each discrete bin represents a pixel population with the same pixel brightness intensity. For example, an 8-bits grayscale image consists of 256 ($2^8$) different possible intensities or tones. Accordingly, the histogram may consist of 256 discrete bins generally numbered from 0 to 255 showing the brightness, of which the $0^{th}$ bin represents the population of black pixels, and the $255^{th}$ bin represents the population of white pixels. However, as the Histogram Calculation 101 requires higher operating power, in an alternative embodiment, it is preferred that the Histogram Calculation 101 produces a histogram with a number of bins less than $2^n$, where n is the number of bits of that image. That could effectively reduce the resource load for storage and transmission, thereby improving the efficiency of the device carrying out the contrast enhancement process 100 in accordance with the present embodiment. Taking the earlier example, instead of having 256 bins for the 8-bit image, a 32-bin histogram may be generated by increasing the gray level width in each bin. Accordingly, each bin now represents 8 continuous gray levels instead of one. In accordance with a further alternative embodiment, instead of having uniform gray level width for each bin, the Histogram Calculation 101 generates a histogram with varying gray level width for each bin.

The Histogram Pre-Process 102 provides pre-processing to the histogram generated by the Histogram Calculator 101 with filters. At first, a SAD weighted temporal filter is applied to minimize variations in the histogram bin's value for temporal consistency. To achieve that, the number of bins, nbBin, of the current histogram (of the current input video frame) are compared with the previous histogram (of the previous input video frame) to compute a sum of absolute difference (SAD) histogram, SADHist, as provided by formula (1), $$SADHist = \sum_{i=1}^{nbBin} \text{abs}(curHist_i - prevHist_i) \tag{1}$$

where $curHist_i$ is the number of pixels in current video frame with gray-level values defined for bin i, and $prevHist_i$ is the number of pixels in previous video frame with gray-level values defined for bin i.

With the SADHist, the current histogram is further filtered with a SAD weighted temporal recursive filter. As the differences between the histograms increase i.e., higher SADHist, the weight of the current histogram is increased relative to the previous histogram. The SAD weight is then normalized with respect to the active window size and the width of histogram bins, and it is tunable by a gain factor, $k_1$. The filtered current histogram is provided by the formula (2), $$curHist_i = wgtHist \times curHist_i + (1 - wgtHist) \times prevHist_i \quad (2)$$

where $$wgtHist = \frac{SADHist \times \frac{2^n - 1}{2^n - binwdh} \times k_1}{nbPix}, 0 \leq wgtHist \leq 1 \quad (3)$$

And where nbPix represents the number of pixels in the defined active window of the input video, n refers to bit rate, binwdh (binwdh=$2^n$/nbBin) refers to the average gray level width of a histogram bin and the gain factor, $k_1$, is a user-defined constant controlling sensitivity to histogram change. The sensitivity of the filter is directly proportional to $k_1$ but inversely proportional to filtering levels. When more filtering is required, lower sensitivity (lower $k_1$) is required, and vice versa.

The processed SAD histogram is used for subsequent processing in the contrast enhancement process 100 as well as for computation of SADHist for a next video frame.

In accordance with the present embodiment, it is preferred that the histogram is in a full size pixel range. That is to say that for an n-bit image, it is required that the number of bins, nbBin, is equal to 2 to the power of n. Accordingly, the Histogram Pre-Process 102 provides conversions/expansions to the histogram when necessary. For the image where nbBin≠$2^n$, the full size pixel range histogram bin, $hist_i$, is derived from the original histogram bin, $Hist_j$, by $hist_i$=$Hist_j$/binwdh, where j=i/binwdh. With the example where the 32 bins histogram for an 8-bit image is generated in the Histogram Calculation 101, the 32 bins histogram is subject to expansion to a 256 bins histogram by dividing each bin value by 8 and repeating the divided or average bin value 8 times along the defined bin region.

Still in the process of Histogram Pre-Process 102, the temporal filtered and possibly expanded histogram is further filtered by a smoothing filter to ensure better continuity between successive histogram bins. It is known that discontinuities between successive histogram bins generate a transfer curve that results in over-contrasted videos during histogram equalization process. Further, instead of a conventional histogram equalization process that flattens the distribution density equally among the pixel level range, which results in unnatural images, the Histogram Pre-Process 102 de-emphasizes the histogram data with a de-emphasis operator in the smoothing filter. In accordance with the present embodiment, it is preferred that the de-emphasis operator provides relatively higher smoothing factors in mid pixel levels than that of low and high pixel levels such that good contrasted images are not further contrasted. The smoothing filter is provided by formulas (4)-(6).

$$hist_i = hist_{i-1} + (hist_i + hist_{i-1}) \times (f(i)/S) \quad (4)$$

$$hist_i = hist_{i+1} + (hist_i + hist_{i+1}) \times (f(i)/S) \quad (5)$$

$$f(i) = g \times abs(i - 2^{n-1}) + c \quad (6)$$

where, $hist_i$ represents the number of pixel at gray level value i, and i is of increment from 0 to ($2^n$-1), then of decrement from ($2^n$-1) to 0; S is a smearing constant directly proportional to smoothing levels; $f(i)$ is a function that decreases the smoothing factor with the distance from mid gray level, $2^{n-1}$, for an n-bit image and g and c are the gain and offset constants respectively describing function $f(i)$, where higher g provides higher differentiation of smoothing factor between different grayscale levels and higher c adjusts offset of the function $f(i)$ to give lower smoothing strength.

Figure 2:
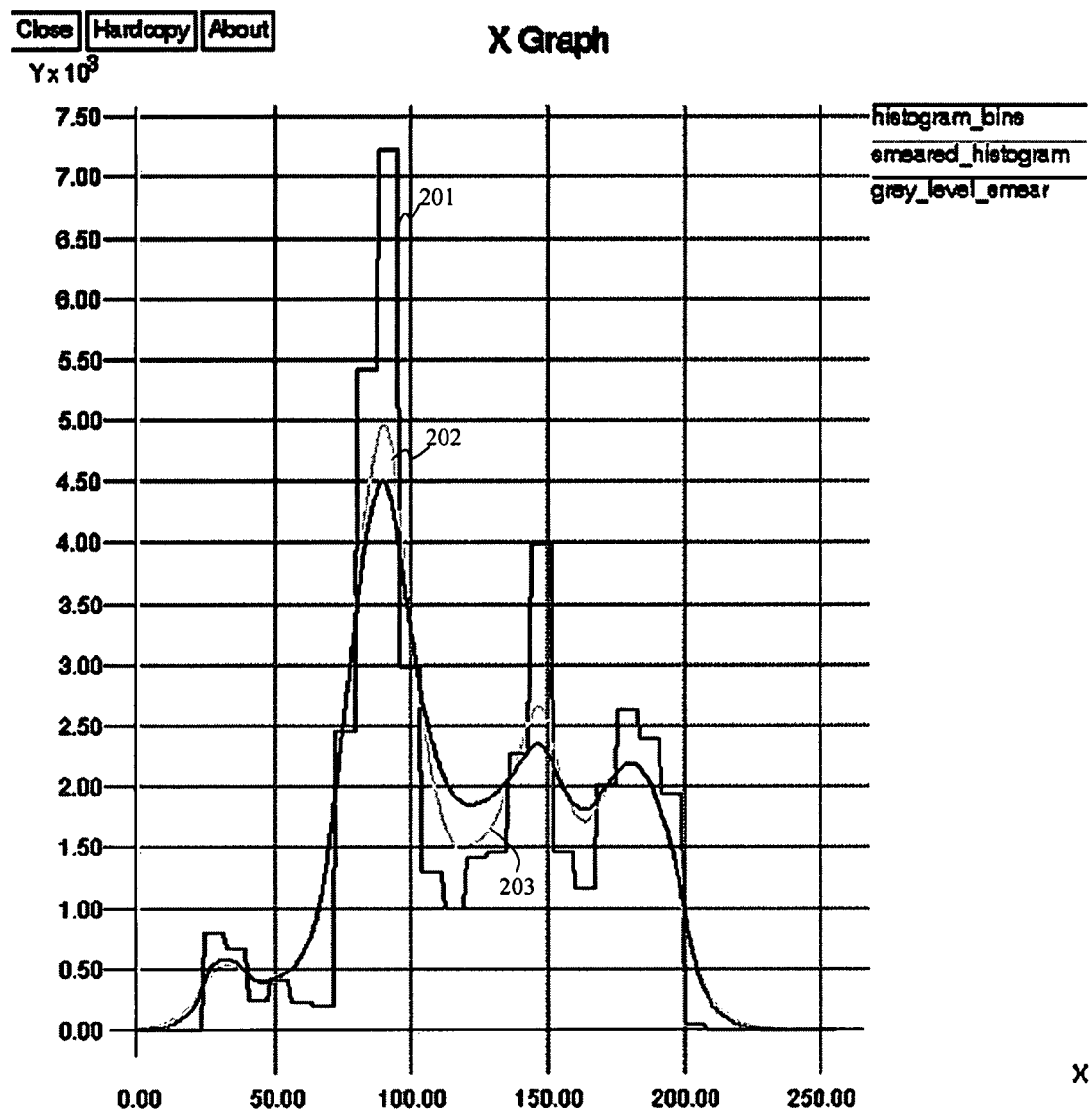
FIG. 2 illustrates an exemplary smoothing operation of the Histogram Pre-Process of FIG. 1.

FIG. 2 shows graphs 201, 202 and 203, illustrating the Histogram Pre-Process 102. The graph 201 represents the histogram being filtered by the weight temporal filter. The graphs 202 and 203 show two smoothened line curves, which were obtained by smoothing the graph 201 via the smoothing filter. The graph 202 is formed without the de-emphasis operator, and the smearing parameters are S=8, g=0 and c=1. On the other hand, the graph 203 is formed with the de-emphasis operator and the smearing parameters are S=8, g=1/128 and c=1/2.

Figure 3:
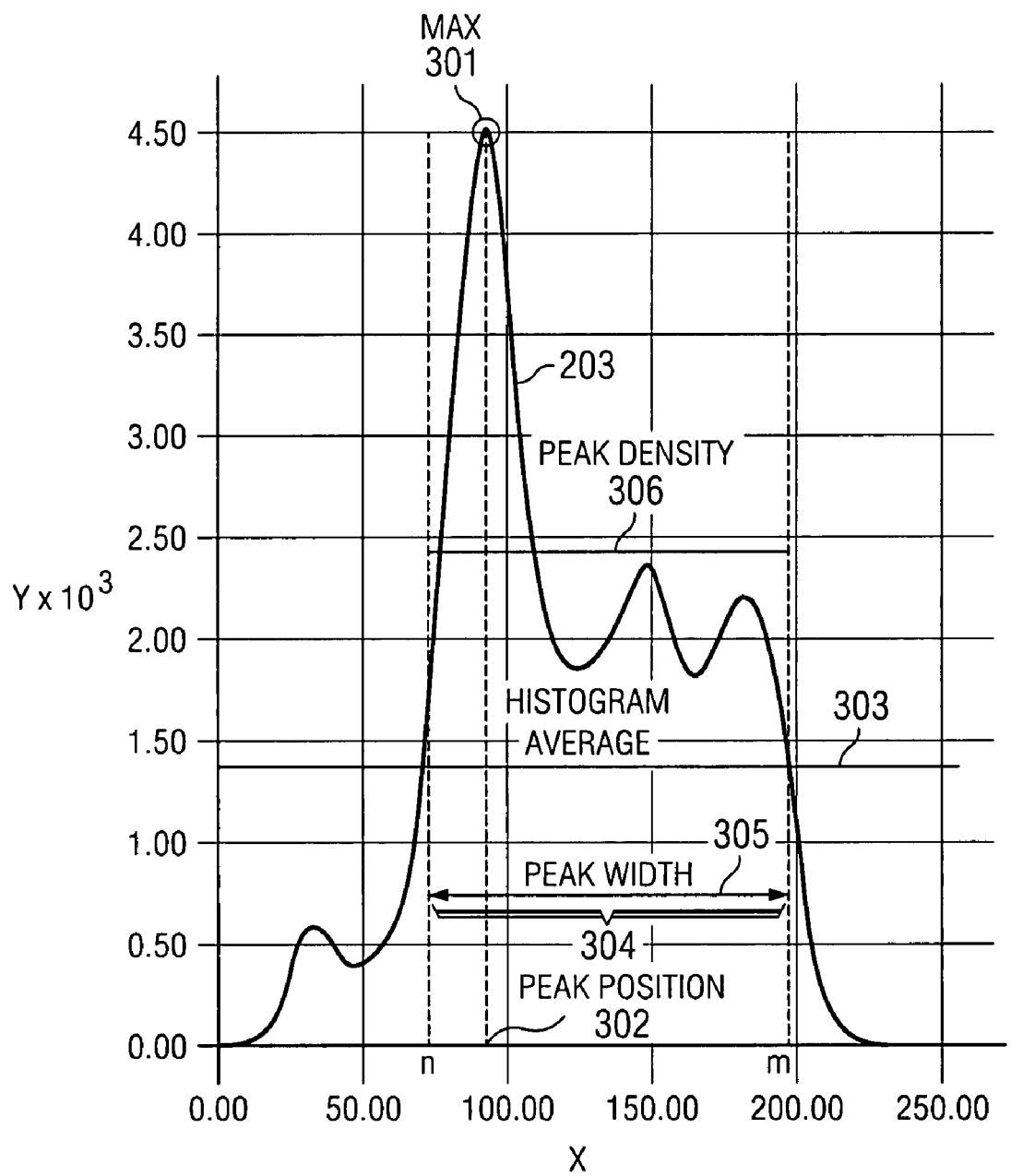
FIG. 3 illustrates an exemplary peak detection in Peak Analysis of FIG. 1.

Referring now to FIG. 3, the graph 203 of FIG. 2 is shown with some of its characteristics marked thereon. The characteristics of the graph 203 are obtained in the Peak Analysis 103, which include, a peak value 301, a peak position 302, a histogram average 303, a peak region 304, a peak width 305 and a peak density 306.

First, the Peak Analysis 103 identifies the peak value 301 of the graph 203. The peak value 301 is a maximum/highest point of the graph 203. Accordingly, the grayscale value of the peak value 301 is identified as the peak position 302, peak_pos. The peak position 302 is provided by the formula (7), $$peak\_pos = j \in \{hist_j = \max\{hist_i\}_0^{2^n-1}\} \quad (7)$$

where j represents a position number in terms of grayscale value of a histogram bin, $hist_j$ represents the histogram bin's value at position j, $\max\{hist_i\}_0^{2^n-1}$ is a function for seeking the maximum (highest) value amongst $hist_0$ to $hist_{2^n-1}$, $hist_i$ represents the histogram bin's value at position i and n represent the number of bits of the image.

The Peak Analysis 103 computes the histogram average 303, hist_avg, of the histogram. The histogram average 303 is an average pixel population that is independent to the peak value 301 provided by formula (8), $$hist\_avg = \frac{\sum_{i=0}^{2^n-1} hist_i}{2^n} \text{ or } \frac{active\_window\_area}{2^n} \quad (8)$$

where active_window_area means the total number of pixels found within the active window of the image.

Then, the histogram average 303 intersects with the graph 203 in at least two points (projected on x-axis as points m and n) and the area of interest according to the present embodiment is a boundary defined by two intersections that includes the peak value 301, herein defined as the peak region 304. The peak region 304 has a width identified as the peak_width 305, peak width, which is provided by the formula (9), $$peak\_width = m - n + 1 \quad (9)$$

where m and n denote an upper bound and a lower bound grayscale value of the peak region 304 respectively.

Next, the peak density 306 is defined as an average pixel population within the peak region 304 provided by the formula (10), $$\text{peak\_density} = \frac{\sum_{i=n}^{m} hist_i}{\text{peak\_width}} \qquad (10)$$

where $$\sum_{i=n}^{m} hist_i$$

represents the total number of pixels within the region bounded by the upper bound m and the lower bound n, i.e. the peak region.

The Peak Analysis 103 then identifies a peak distribution (not shown), peak_distribution, defined by the sum of histogram value in a section of grayscale level relative to a width of the section, which is provided by the formulas (11)-(14), $$\text{peak\_distribution} = \frac{\sum_{i \subset sec_X} hist_i}{\text{sec\_width}}, x \in \{low, upp\} \qquad (11)$$

where, $$sec_{upp} = [\text{peak\_pos} + 1, 2^n - 1] \qquad (12)$$

$$sec_{low} = [0, \text{peak\_pos}] \qquad (13)$$

$$\text{sec\_width} = \begin{cases} 2^n - \text{peak\_pos} & sec_{upp} \\ \text{peak\_pos} & sec_{low} \end{cases} \qquad (14)$$

where $sec_{upp}$ represents a position of the histogram bins from the histogram bin next to the peak to the last $((2^n-1)^{th})$ histogram bins at the right of the peak, $sec_{low}$ represents a position of the histogram bins from the first $(0^{th})$ bins to the peak.

Once the required data are obtained in the Peak Analysis 103, the Contrast Enhancement Process 100 proceeds to the Histogram Redistribution 104. It is observed that when enhancing an image contrast by applying histogram equalization to the entire histogram region, risk of unwanted distortion exists. Further, having a flatter histogram shape over the entire histogram, the noise may be enhanced in un-uniformly colored areas of the image. Thus, in accordance with this embodiment of the present invention, it is preferable that the histogram modification for contrast enhancement is performed in a selective area of the histogram. In accordance with one embodiment, histogram modification is performed within the peak region 304.

Figure 4:
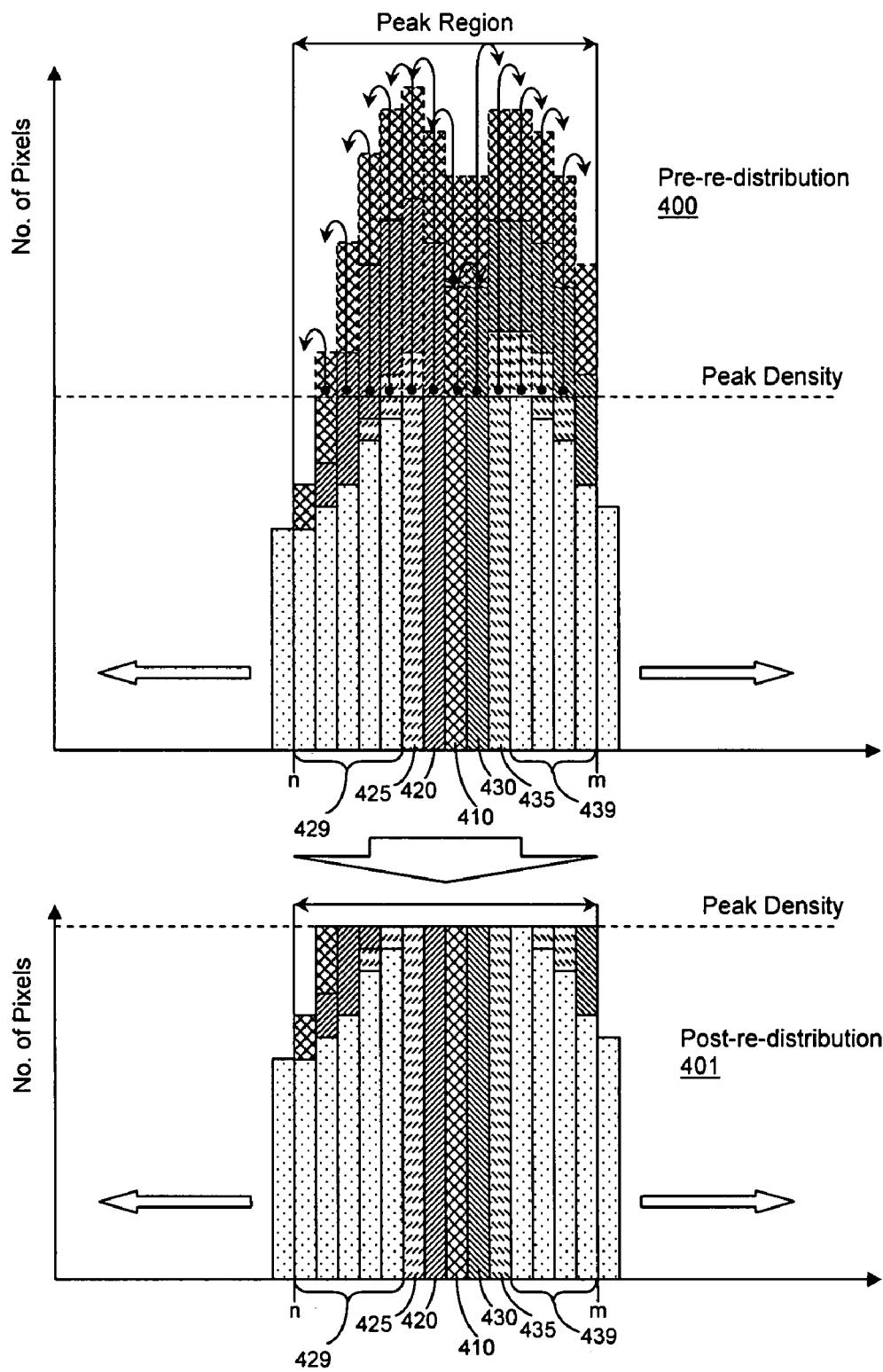
FIG. 4 illustrates the histogram re-distribution process in Histogram Re-Distribution block in accordance with one embodiment of the present invention.

As illustrated in FIG. 4, the Histogram Redistribution 104 is performed on the histogram which was filtered by the smoothing filter during the Histogram Pre-Process 102. Based on the peak region 304 defined in the Peak Analysis 103, the Histogram Redistribution 104 distributes pixels of the histogram bins within the peak region 304 symmetrically away from the peak position 301. To pre-empt over-stretching of pixel values around the histogram bin which corresponds to the peak position 302, the Histogram Redistribution 104 limits the distributions to only the pixels which fall above the peak density 306 and are within the peak region 304.

FIG. 4 shows histogram bins that are bound within the peak region 304. The histogram in FIG. 4 is a mock example, which is not accorded to any scale nor it is based on any real histogram illustrated above. It is only for elaborating the pixel distribution in accordance with the present embodiment. The histogram 400 has a histogram bin 410 that locates at the peak position 302, i.e. the highest histogram bin. The histogram bin 410 and the parts thereof are filled with cross-lines-pattern. A histogram bin 420, positioned immediately to the left of the histogram bin 410, and the parts thereof are filled with upward-diagonal-lines-pattern. The next left histogram bin is a histogram bin 425 that is filled with upward-diagonal-dash-lines-pattern. Then all the subsequent bins 429 at the left are filled with dots-pattern. A histogram bin 430, positioned immediately to the right of the histogram bin 410, and the parts thereof are filled with downward-diagonal-lines-pattern. The next right histogram bin is a histogram bin 435 that is filled with downward-diagonal-dash-lines-pattern. Then all the subsequent bins 439 at the right are filled with dots-pattern. In this mock example, only histogram bins 410, 420, 425, 430 and 435 have a pixel amount above the peak density 306. The histogram bins 429 and 439 have pixel amount lower than the peak density 306. The histogram 401 shows a histogram, which is after the Histogram Re-Distribution 104. In histogram 400, the bins with dashed-outline are subject to re-distribution. Further, the histogram 400 provides lines, each start with a dot and end with an arrow, are shown to illustrate the bin (pixel) distributions, wherein the dots indicate where in which the bin are clipped off, and the arrows indicate the directions in which the clipped off bins are moved.

Still in FIG. 4, starting from the histogram bin 410, the pixel value exceeds the peak density 306 is clipped and divided into half. Half of the clipped value is added to the histogram bin 420. As the histogram bin 420 exceeds the peak density 306 as well, the excess portion of the bin 420 is clipped off and added to the histogram bin 425 together with the add-on from bin 410. The clipping and moving processes are repeated to the histogram bins 429 until the distribution on the left reaches the left boundary, n, of the peak region 304. In this way, pixel values within the peak region 304 in excess of the peak density 306 recursively overflows in the left direction until it is truncated. Likewise, the other half of the clipped value of the histogram bin 410 is added to the histogram bin 430. As the histogram bin 430 exceeds the peak density 306 as well, the excess portion of the bin 430 is clipped off and added to the histogram bin 435 together with the add-on from bin 410. The clipping and moving processes are repeated to the histogram bins 439 until the distribution on the right reaches the right boundary, m, of the peak region 304 where excess overflows are truncated to the right of the peak position 302.

Still in the FIG. 4, as the Histogram Redistribution 104 occurs only within the peak region 304, unlike the common histogram distribution/modification known in the art, which flattens the mid level grayscale entirely, the contrast enhancement 100 according to the embodiment preserves a peak region to provide an overall natural output video.

The contrast enhancement process 100 provides gains in the adaptive gain computation 105 for controlling level/strength of the contrast enhancement. Instead of a constant contrast gain, the present embodiment provides an adaptive contrast gain, adaptive_gain, to prevent occurrence of over-contrasted video artifacts during histogram equalization, which may result in undesired contouring effects, and lacking of graduation. This is particularly useful for low contrast images/videos represented by fewer pixel levels to maintain a satisfactory naturalness of a processed image/video frame. The adaptive gain is computed based on a peak density factor (peak_density_factor), a peak position factor (peak_pos_factor) and a peak distribution factor (peak_dist_factor), which is provided in formula (15)

$$\text{adaptive\_gain} = \text{user\_gain} \times \text{peak\_density\_factor} \times \text{peak\_pos\_factor} \times \text{peak\_dist\_factor} \qquad (15)$$

where user_gain is a user defined gain.

Figure 5:
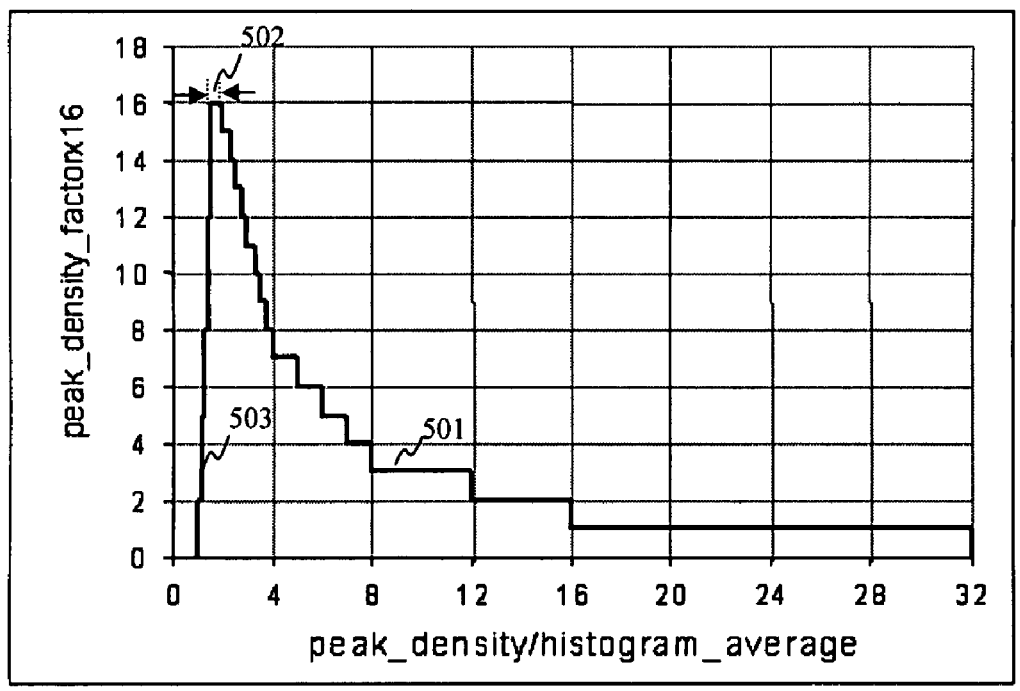
FIG. 5 illustrates the relationship between the peak density factor and peak density in accordance with one embodiment of the present invention.

FIG. 5 illustrates the characteristic of the peak density factor which is provided by the formula (16). The X-axis represents a division of peak density by histogram average, and the Y-axis represents an amplified peak density factor by a factor of 16. The constants $k_5$ and $k_6$ are both set at 2, for example.

$$\text{peak\_density\_factor} = \begin{cases} k_5 \times ((\text{peak\_density}/\text{hist\_avg}) - 1) & \text{peak\_denisty}/\text{hist\_avg} < 1.5 \\ 1 & 1.5 \leq \text{peak\_density}/\text{hist\_avg} \leq 2 \\ k_6 \times \text{hist\_avg}/\text{peak\_density} & \text{peak\_density}/\text{hist\_avg} > 2 \end{cases} \quad (16)$$

where $k_5$ and $k_6$ are constants which may be defined by user.

As shown in FIG. 5, the peak density factor begins with graph section 503, which provides a linear raise graph that intersects with the X-axis at 1. Following that, a graph section 502 provides a unity peak density factor for a range of peak density between 1.5 and 2 times the histogram average. When the peak density grows more than two times the histogram average, the peak density factor have a inverse relationship with the peak density as shown in graph section 501. Back to the graph section 503, it provides control of a gradual transition of contrast strength between images that have peaks, which require contrast enhancement, and those already have good contrast, which require little contrast enhancement. The graph section 502 provides saturation, which is suitable for videos that require normal contrast enhancement. The graph section 501 provides a non-linear contrast gain adapted for peak density as the factor between the peak density and histogram average grows. As shown in FIG. 5, it is understood that range for graph section 501, 502 and 503 is for illustration only, not limitation. The aim is to provide a non-linear contrast enhancement based on the peak density and histogram average of the processing image. Depending on the quality desired, the peak density factor may provide a unity factor (normal contrast enhancement) at a range other than between 1.5 to 2 times the histogram average and less contrast enhancement for images having a ratio of peak density to histogram average falls outside the range designated for unity density factor.

Inclusion of the peak position factor for computing the adaptive gain is to prevent over-spreading of image histogram towards one end when the peak is detected at the other end. It is understood that human visual perception is a non-linear function of image brightness and the human eye is more sensitive to middle range of brightness. Thus, the present embodiment imitates the visual sensitivity by providing higher gains to peak intensities along the center of the pixel range (mid-tone), relatively lower gain for peaks towards the darker range such that sensitive details in relatively brighter regions are not over-stretched and very low gains for peaks towards the brighter ends so that more sensitive details in relatively darker regions are not stretched excessively.

Figure 6:
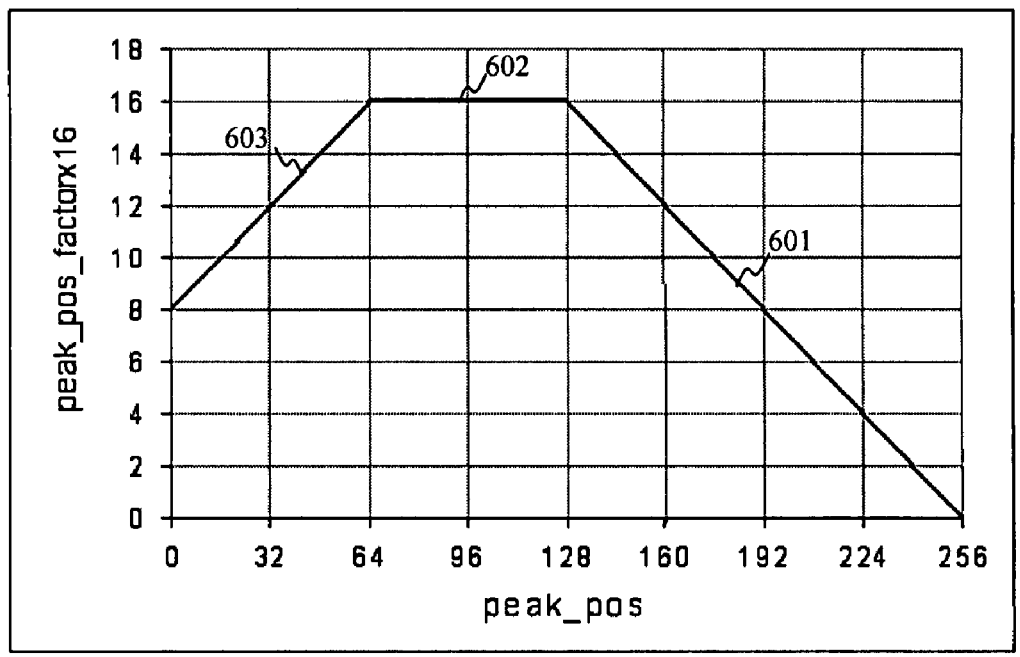
FIG. 6 illustrates the relationship between the peak position factor and peak position in accordance with one embodiment of the present invention.

To cater to the above need, it is provided that the peak position factor having characteristics as shown in FIG. 6. As shown, the graph section 602 provides saturation for peak position between quarter and mid brightness level (64<peak_pos<128), and both graph section 601 and graph section 603 provide a linear downward incline of the peak position factor towards the brighter end and the darker end respectively. The peak position factor is provided by formula (17), $$\text{peak\_position\_factor} = \quad (17)$$

$$\begin{cases} (2^n - \text{peak\_pos})/2^{n-1} & \text{peak\_pos} > 128 \\ 1 & 64 \leq \text{peak\_pos} \leq 128 \\ (\text{peak\_pos})/2^{n-1} + 0.5 & \text{peak\_pos} < 64 \end{cases}$$

where n is the number of bit of the image. The aim for formula (17) is to provide non-unity peak position factor, depending on the pixel brightness (grayscale) within the same image. It is understood that, subject to personal preference, mid-tone range which is more eye pleasing may vary. The mid-tone rage (64<peak_pos<128) selected in FIG. 6 is for illustration only, not limitation and this range may be altered in accordance with another embodiment of the present invention.

Unlike adaptive gains in prior arts, the present embodiment does not limit the gain such that over-contrasted picture cannot be inverse contrasted. The peak position factor when applies in contrast mode, defined as the overall expansion of gray level i.e. a transfer curve is above y=x curve for lower section (left of peak) and transfer curve is below y=x for upper section (right of peak), and vice versa when the peak position factor is applied in inverse contrast mode. Accordingly, one way of finding out whether the peak position factor is applied in contrast mode or in inverse contrast mode is to calculate the difference, dev, of the areas under the transfer curve and the y=x curve, where dev is provided in formula (18).

$$dev = \sum_{i=p}^{q} \left( \sum_{j=p}^{i} hist_j - \frac{i-p}{q-p} \times \sum_{j=p}^{q} hist_j \right) \quad (18)$$

where, $$\sum_{j=p}^{i} hist_j$$

refers to the transfer curve value at any point i within [p,q];

$$\frac{i-p}{q-p} \times \sum_{j=p}^{q} hist_j$$

refers to an identity transfer curve value, whereby the identified transfer curve is an y=x function; and $$\sum_{j=p}^{q} hist_j$$

refers to the total area under the transfer curve.

As a result, in contrast mode, $$[p, q] = \begin{cases} [0, \text{peak\_pos}] & dev < 0 \\ [\text{peak\_pos} + 1, 2^n - 1] & dev > 0; \end{cases}$$

and when in inverse contrast mode, $$[p, q] = \begin{cases} [0, \text{peak\_pos}] & dev \geq 0 \\ [\text{peak\_pos} + 1, 2^n - 1] & dev \leq 0 \end{cases}$$

During pixel distributions, the pixels are randomly distributed on an image. However, such random distribution may result in unsightly contrasted patches on the image, especially when the pixels are distributed in the image as texture details. Thus, the peak distribution factor is provided to prevent excessive spreading among the histogram when the number of pixels in the distribution section is insignificant compare to the histogram average. The peak distribution factor is provided by formula (19), $$\text{peak\_dist\_factor} = \begin{cases} 1 & \text{peak\_dist} \geq \text{hist\_avg} \\ 1 - 0.5 \times \text{hist\_avg}/\text{peak\_dist} & 3 \times \text{hist\_avg} < 3 \times \text{peak\_dist} < \text{hist\_avg} \\ 0 & 3 \times \text{peak\_dist} \leq \text{hist\_avg} \end{cases} \quad (19)$$

Figure 7:
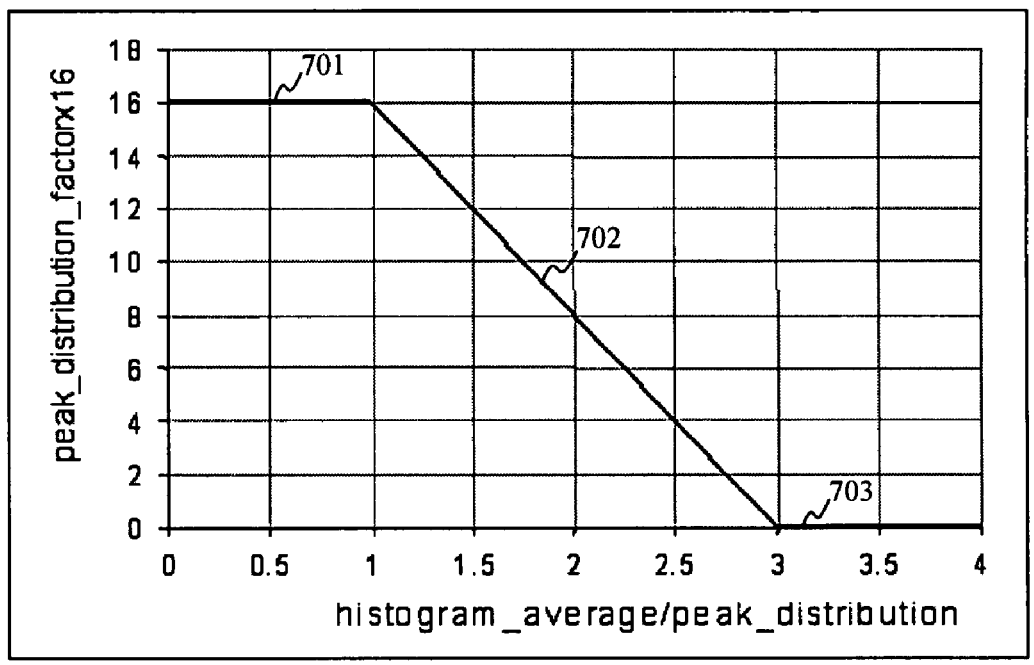
FIG. 7 illustrates the relationship between the peak distribution factor and peak distribution in accordance with one embodiment of the present invention.

FIG. 7 illustrates the relationship between the peak distribution factor and the peak distribution. The X-axis represents the division of histogram average by peak distribution or how large histogram average is a compared to peak distribution. The Y-axis represents the amplified peak distribution factor with a factor of 16. Graph section 701 shows unity saturation of peak distribution factor, preferably, when histogram average is equal or smaller than peak distribution. Graph section 702 shows that peak distribution factor decreases linearly as peak distribution decreases relative to histogram average. Graph section 703 shows zero saturation of peak distribution factor, preferably, when the histogram is at least 3 times larger than the peak distribution. At zero saturation, no contrast enhancement is performed, for example, for images that do not require any contrast enhancement.

Figure 8:
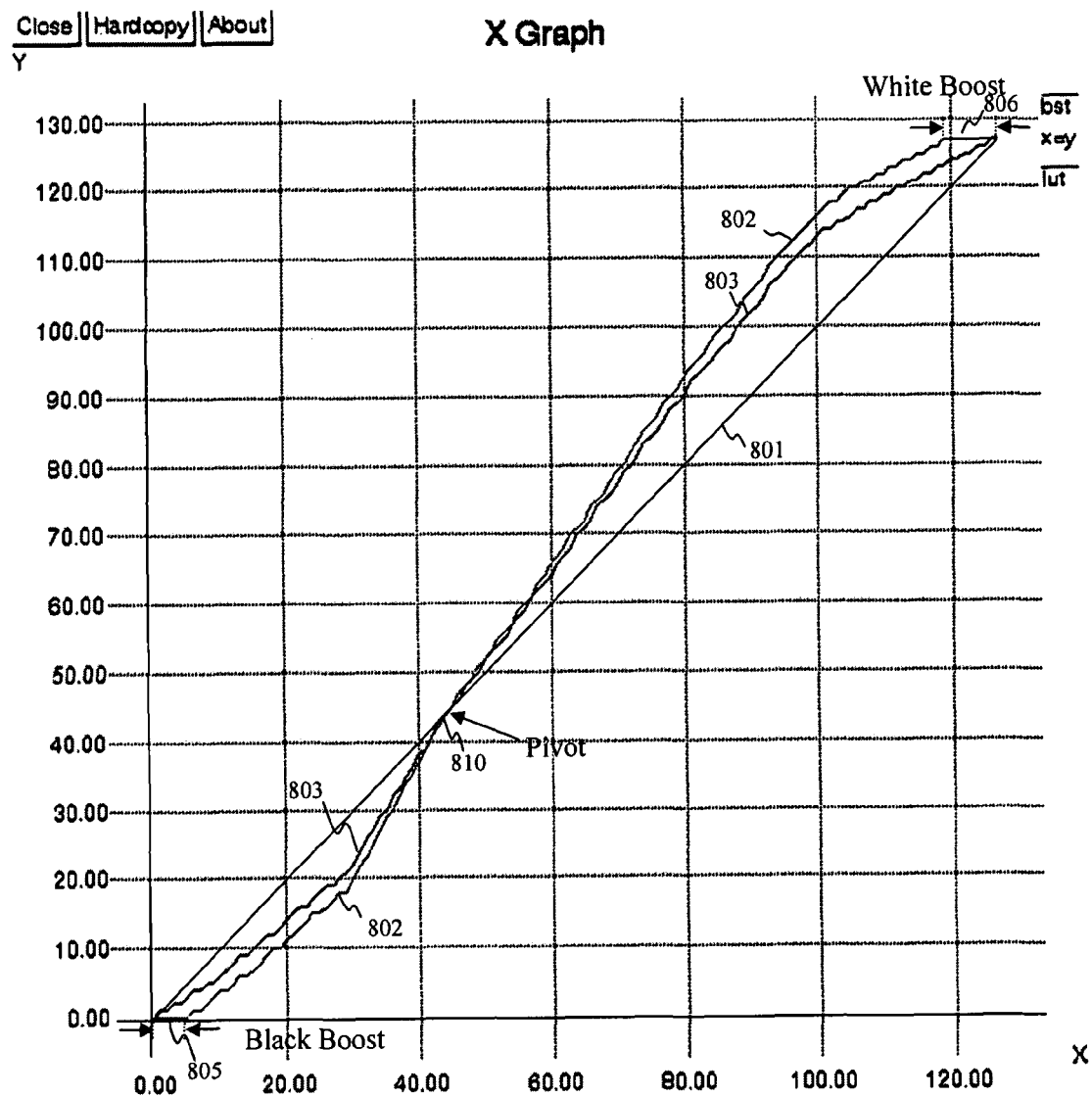
FIG. 8 illustrates an exemplary black and white boost in transfer curve in accordance with one embodiment of the present invention.

When the adaptive gain is generated, the Transfer Curve Generation 106 generates transfer curves as shown in FIG. 8. The X-axis represents the grayscale of an input image and the Y-axis represents the grayscale of an output image, generally known as tone map. The tone map is commonly used in graphic editing tools for adjusting brightness and contrast. For this document, the explanation for brightness adjustment is disregarded.

Referring to FIG. 8, for a pre-process image where there is no change in the grayscale, the input image is equal to the output image, as represented by the graph Y=X 801. To adjust the contrast of the input image, the Y=X graph 801 needs to be transformed into an "S" curve or an inverse "S" curve. To achieve that, a pivot point 810 is defined along Y=X graph 801. The upper portion and lower portion of the Y=X graph 801, also known as cumulative density functions, are bent in two opposing directions about the pivot point 810, while the two ends of the Y=X graph 801 remains at Y=X. Effectively, the mid-tone range of the output image is changed which altered the contrast of the image. As the present embodiment targets to increase the contrast, an "S" curve is formed as transfer curve 802 and 803.

In FIG. 8, according to the present embodiment, the pivot point 810, $x_p$, is set as the peak position and the transfer curve 803 is provided by the formula (20), $$y' = \begin{cases} \dfrac{c(x)}{c(x_p)} x_p & x \leq x_p \\ x_p + (2^n - 1 - x_p) \dfrac{c(x) - c(x_p)}{1 - c(x_p)} & x > x_p \end{cases} \quad (20)$$

$$\text{curTC} = x + \text{adaptive\_gain} \times (y' - x)$$

where curTC and x are the input and output gray-level value of pixel, $x_p$ is the peak\_pos and c(x) and c($x_p$) are the cumulative function of x.

Still in FIG. 8, the transfer curve 803 is a transfer curve with two independent cumulative density functions in the lower and upper sections pivoted about the pivot point 810 to form an "S" curve. Each cumulative density function is then normalized by the section width and the peak position is mapped onto itself. The output transfer curve, curTC is then scaled linearly by the adaptive gain computed earlier.

Humans generally perceive total black in very dark areas and total white in very bright areas as visually more pleasing. In an alternative embodiment, black and white boost are added to the transfer curve 803 to form the transfer curve 802 such that dark areas are brought closer to black and bright areas are brought closer to white. The operation of the black boost 805 to the transfer curve 803 is such that the transfer curve in the lower section, fixed to the pivot point 810, is stretched vertically and clipped at the black level, resulting in a plateau at the lowest end of the pixel range. Similarly, the operation of the white boost is such that the transfer curve in the upper section, fixed to the peak position, is stretched vertically and clipped at the white level, resulting in a plateau at the highest end of the pixel range. The transfer curve 802, y", is provided by the formula (22)-(24), $$\text{curTC} = x + \text{adaptive\_gain} \times (y'' - x) \quad (21)$$

$$y'' = \begin{cases} \dfrac{c(x)}{c(x_p)} (x_p + bbst) - bbst & x \leq x_p \\ x_p + (x_{2^n-1} - x_p + wbst) \dfrac{c(x) - c(x_p)}{1 - c(x_p)} & x > x_p \end{cases} \quad (22)$$

$$bbst = \dfrac{\text{low\_sec\_width}^2}{k_b} \quad (23)$$

$$wbst = \dfrac{\text{upp\_sec\_width}^2}{k_w} \quad (24)$$

where, $k_b$ and $k_w$ are user defined constants for black and white boost respectively, upp\_sec\_width is a count of the grayscale level from the peak to $(2^n-1)^{th}$ grayscale level, lower\_sec\_width is a count of the grayscale level from the $0^{th}$ grayscale to the peak.

In the above formulas, the strengths of the black boost, bbst, and white boost, wbst, are adapted to the width of the lower and upper section with user adjustable factors $k_b$ and $k_w$. An example parameter can be set as $k_b$=512 and $k_w$=2048. Typically, $k_w$ is larger or equal to $k_b$ such that the effect of white boost is less than that of black boost as darker saturated areas are more visually pleasing. The black and white boosts are integrated in the transfer curve generation and the output transfer curve is clipped within the defined pixel range.

The Transfer Curve Post-Process 108 processes the transfer curve with a weighted temporal filter that provides temporal stability in the contrast enhancement of video. The current transfer curve is compared with the previous transfer curve to compute SADTC for a defined pixel range, where the SADTC is provided in formula (25), $$SADTC = \sum_{i=0}^{2^n-1} \text{abs}(curTC_i - prevTC_i) \quad (25)$$

where $curTC_i$ is the output value of the current transfer curve with input i; and $prevTC_i$ is the output value of the previous transfer curve with input i.

With the SADTC, the current transfer curve is subsequently filtered with a SAD weighted temporal recursive filter. As the differences between the transfer curves increase i.e. higher SADTC, the weight of the previous transfer curve is increased relative to the current transfer curve such that the transient change in transfer curve is smooth and impulse changes like flicker are avoided.

A transfer curve weight, wgtTC, is directly proportional to the SADTC and is adjustable by a gain factor, $k_2$, for a fixed transfer curve range. $k_2$ may be decreased for increased filter sensitivity to change and example value is $k_2=1/16$. In addition, the possibility of scene change is considered in filter weights to reduce sharply the weight or remove the influence of the previous transfer curve when a scene change occurs. Scene change can be characterized by a stark difference in picture histogram. The calculated weight for the histogram filter wgtHist before clipping to range [0,1] in the Histogram Pre-Process 102 can be used as indication for scene change. The scene weight is a scaled and offset version of wgtHist'. Example values are $k_3=256$ and $k_4=1/8$. The final transfer curve filter weight is a clipped difference of transfer curve weight, wgtTC, and scene weight, wgtScene, as provided in the formulas (26)-(29)

$$\text{wgtTC}=SADTC/k_2, 0 \leq \text{wgtTC} \leq 1 \quad (26)$$

$$\text{wgtScene}=\text{wgtHist}'/k_3-k_4 \quad (27)$$

$$\text{wgtTC}=\text{wgtTC}-\text{wgtScene}, 0 \leq \text{wgtTC} \leq 1 \quad (28)$$

$$curTC_i=\text{wgtTC} \times prevTC_i+(1-\text{wgtTC}) \times curTC_i \quad (29)$$

where the prevTC refers to the transfer curve right before the change of scene and curTC refers to the transfer curve right after the change of scene, and $k_2$-$k_4$ are constants.

In accordance with an alternative embodiment, further temporal stability and robustness can be achieved with gain control between consecutive fields. An exemplary embodiment is the limitation of the change in final adaptive gains for each section to be within ±1/64 of the maximum gain of the contrast enhancement system such that the adaptive gains do not create sudden change in the enhanced video as a result of the analysis of its content.

In accordance with an alternative embodiment, the transfer curve may preferably be implemented in the form of a look-up table. For memory-saving implementations of transfer curve that has range or resolution less than the pixel range, the pixel mapping function may preferably extract the neighboring table entries and perform a linear interpolation to compute the output pixel value.

In the above description, the term video, video frame, and video image are used. It is understood to those skilled persons that embodiments of the present invention may be applied to different images sources, including broadcasted videos, video CDs, DVDs, or still images, to improve the contrast quality with user-defined contrast strength before displaying or encoding.

Figure 9:
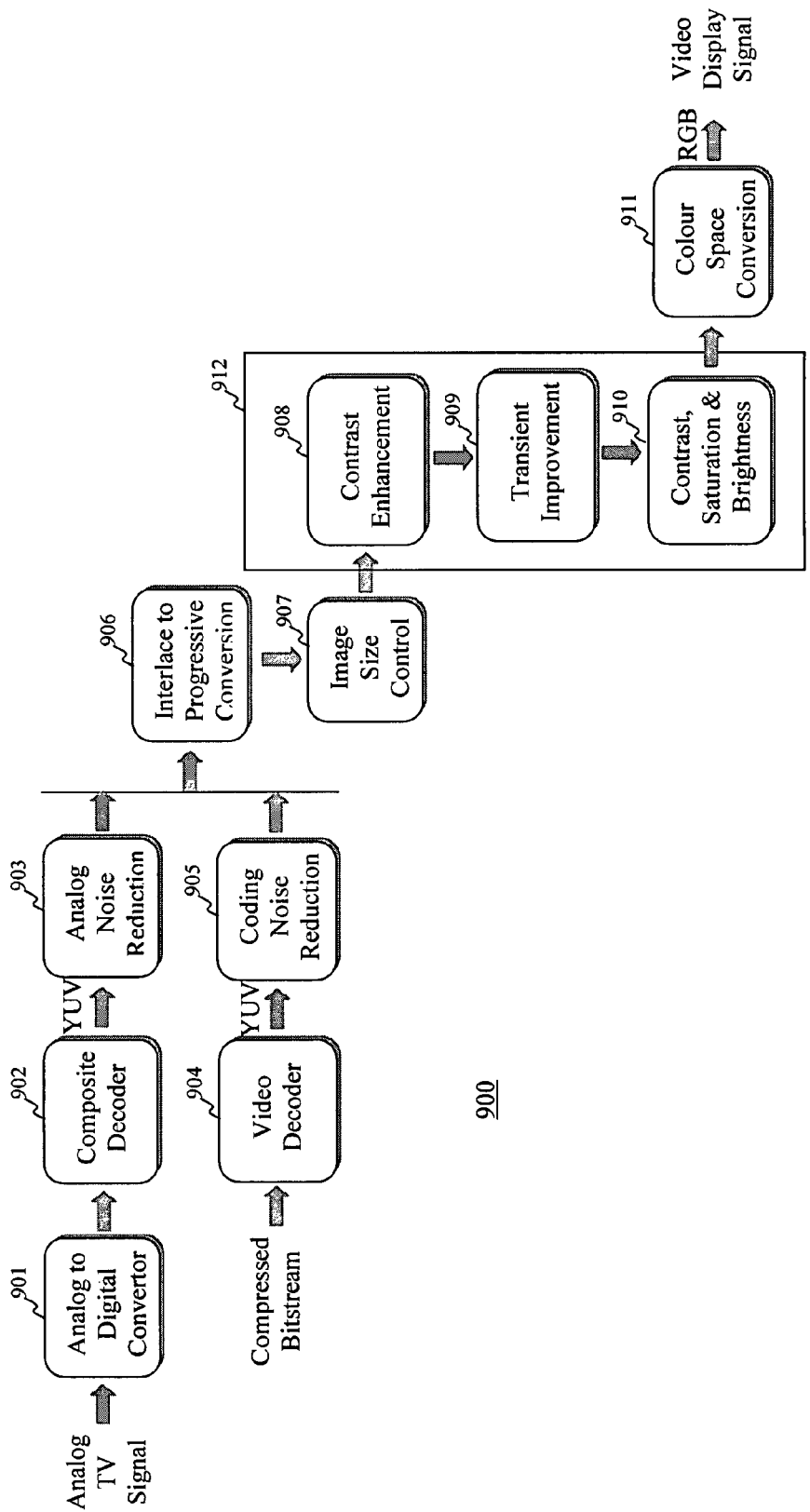
FIG. 9 shows a schematic block diagram of a TV display processor in accordance with one embodiment of the present invention.

Referring now to FIG. 9, there is provided a schematic block diagram of a TV display processor 900 having the contrast enhancement process 100 embedded therein. The TV display processor 900 as described herein is adapted to receive analog signals, i.e. broadcasted signals from antenna, and digital signals, i.e. video signals from digital video players.

Also as in FIG. 9, when the TV display processor 900 received broadcasted analog signals, it converts the analog signals to digital composite signals via Analog to Digital Converter 901. The digital composite signals are then decoded into component YUV (Luminance-Chrominance) signals (one luminance and two chrominance components) in the Composite Decoder 902. These components may be processed by Analog Noise Reduction 903 to remove undesired Gaussian and impulse noise, which are introduced during transmission and conversion processes. Temporal and spatial noise filters may be used for Analog Noise Reduction 903. Likewise for digital input signals, often in the form of compressed bit streams for example MPEG, are decoded into component YUV signals through Video Decoder 904, for example MPEG decoder. The uncompressed video signals are further processed by Coding Noise Reduction 905 to eliminate artifacts resulting from coding processes using de-blocking and de-ringing filters. The noise reduced video signals are then converted to progressive signals in an Interlace to Progressive Conversion 906. The progressive signals are then scaled, cropped and zoomed to an appropriate size and format via the Image Size Control 907. The processed video signals are enhanced for better subjective effects with an Image Enhancement Circuit 912 prior to output.

In FIG. 9, the Image Enhancement Circuit 912 includes Contrast Enhancement 908, Transient Improvement 909 and Contrast, Saturation and Brightness Adjustment 910. Briefly, the Contrast Enhancement 908 performs the contrast enhancement processing 100 of FIG. 1, for increasing the video contrast. The Transient Improvement 909 improves the video edge details. The Contrast, Saturation & Brightness Adjustment 910 adjusts a dynamic range and saturation of the video according to user preferences. Subsequently, the enhanced video signals are converted to an appropriate color format, using Color Space Conversion 911 for outputting. The color format is dependent on the type of output device used for displaying, for example, RGB signal format is used for cathode ray tube (CRT) display.

Figure 10:
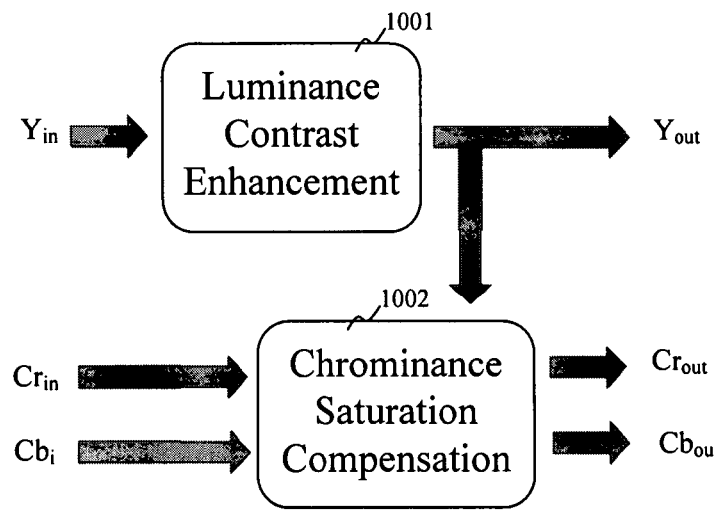
FIG. 10 shows a schematic block diagram of a contrast enhancement process applying on a component YUV signal in accordance with one embodiment of the present invention.
Figure 11:
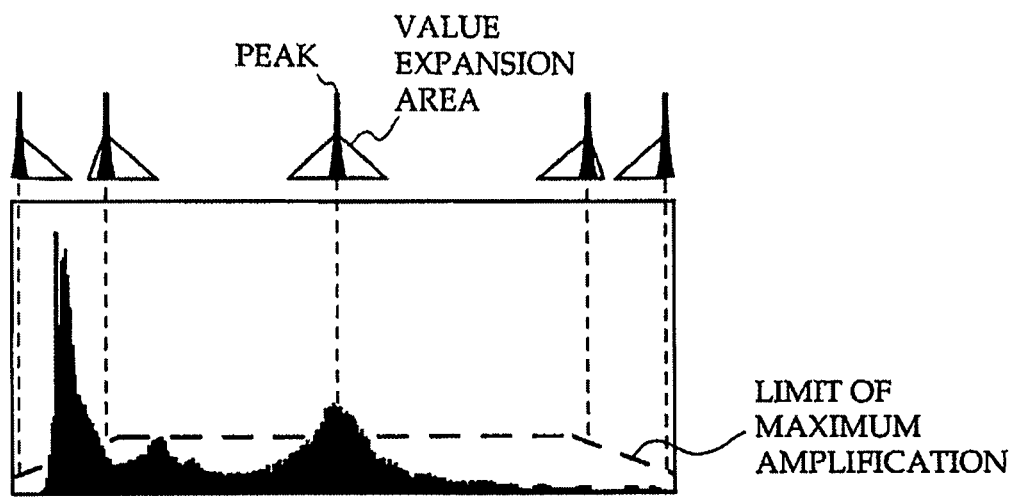
FIG. 11 illustrates a known method of equalizing histogram peaks.

According to an embodiment of the present invention, the contrast enhancement process 100 may be applied in any formats of videos or still images. FIG. 10 illustrates a schematic block diagram of contrast enhancement of the component YUV signals in accordance with one embodiment of the present invention, which occurs in the Contrast Enhancement 908 of the Image Contrast Enhancement 912 of FIG. 9. The luminance signal $Y_{in}$ of the component YUV signals is processed by a Luminance Contrast Enhancement 1001 to provide an enhanced output signal $Y_{out}$. The Luminance Contrast Enhancement 1001 performs contrast enhancement based on the operations of the contrast enhancement process 100. The chrominance signals $Cr_{in}$ and $Cb_{in}$ of the component YUV signals are processed by a Chrominance Saturation Compensation 1002 in dependence of the change in luminance signals $Y_{in}$ and $Y_{out}$ to give compensated chrominance signals $Cr_{in}$ and $Cb_{out}$. A known method of Chrominance Saturation Compensation may be found in US patent publication 2005/007497.

Still in FIG. 10, in conjunction with FIG. 1, the Histogram Calculation 101 generates a histogram for the luminance signal $Y_{in}$ of the component YUV signals. As mentioned earlier, it is preferred that the histogram is in a discrete number of bins less than the full pixel level range. For example, the Histogram Calculator 101 provides a histogram with 32 bins for an 8-bits luminance signal, each bin includes a fixed bin width of 8 consecutive grayscales. It is also understood that, in accordance with a further alternative embodiment, the bin width of each bin may include varying number of consecutive grayscales, preferably, less bin width for mid-tone bins and gradually wider bin width for brighter and darker tone bins. As mentioned, the histogram of the 8-bits luminance signal will be expanded to full size pixel range (i.e. one grayscale per bin) during the Histogram Pre-processing 102, as preferred by the Contrast Enhancement Process 100.

In accordance with an embodiment of the present invention, it should preferably, but not limited, be applied on a relatively noise-free video or a video that has subjected to noise reduction to prevent undesirable effects of noise amplification. Contrast Enhancement Process 100 may be applied in conjunction with detail and color enhancement techniques to provide a full image enhancement solution.

The industrial fields of application include video-related consumer products like television, display sets, video CD player, DVD players and set-top-boxes and software products with image processing, video editing functions.

While this detailed description has set forth some embodiments of the present invention, the appended claims are sufficiently supported to cover and will cover other embodiments of the present invention which differ from the described embodiments according to various modifications and improvements apparent to those skilled in the art. For example, the contrast enhancement process may identify a plurality of peaks from the histogram for re-distributing the histogram. In addition, the contrast enhancement process may provide a fully automated adaptive gain computation either by excluding the user gain as one of the factor, or by pre-setting the user gain as 1.

What is claimed is:

1. A process for enhancing contrast of an image having pixels in different brightness intensities, the process comprising:
generating a histogram in discrete bins, each bin representing a pixel population of at least one pixel brightness intensity;
computing a smoothened line curve from the generated histogram;
computing an average pixel population of the histogram;
identifying a peak and a peak region of the histogram, wherein the peak region is a range of discrete bins around the peak bounded by intersection of the smoothened line curve with the computed average pixel population of the histogram;
computing an average pixel population of the peak region;
distributing the pixel populations of the discrete bins within the peak region that exceed the average pixel population of the peak region to produce a re-distributed histogram, wherein distributing is limited to the discrete bins within the peak region; and
generating a transfer curve for mapping onto the image from the re-distributed histogram.

2. The process according to claim 1, wherein the histogram has $2^n$ discrete bins, where n is number of bits of the image.

3. The process according to claim 1, further comprising expanding the histogram to provide $2^n$ discrete bins when the generated histogram has a number of discrete bins less than $2^n$, where n is number of bits of the image.

4. The process according to claim 1, wherein computing a smoothened line curve comprises filtering the histogram with a smoothing filter for avoiding discontinuities of pixel population between successive discrete bins.

5. The process according to claim 4, wherein the smoothing filter comprises smoothing factors, and wherein the smoothing filter provides relatively higher smoothing factors at mid level pixel intensities than that of high and low pixel intensities.

6. The process according to claim 5, wherein the smoothing filter further comprises a smearing parameter for de-emphasizing the histogram.

7. The process according to claim 6, wherein the peak, the peak region, and the peak density are identified based on the filtered histogram.

8. The process according to claim 1, wherein distributing comprises distributing the pixel populations which exceed the average pixel population of the peak region along two sides of the peak.

9. The process according to claim 1, wherein distributing further comprises truncating overflows of the distributed pixel population beyond the peak region.

10. The process according to claim 1, further comprising computing an adaptive gain based on the peak, the peak region and the average pixel population.

11. The process according to claim 10, wherein the adaptive gain is computed based on a peak density factor provided by formula $$\text{peak\_denisty\_factor} = \begin{cases} k_5 \times ((\text{peak\_density}/\text{hist\_avg}) - 1) & \text{peak\_density}/\text{hist\_avg} < 1.5 \\ 1 & 1.5 \leq \text{peak\_density}/\text{hist\_avg} \leq 2 \\ k_6 \times \text{hist\_avg}/\text{peak\_density} & \text{peak\_density}/\text{hist\_avg} > 2 \end{cases},$$

where $k_5$ and $k_6$ are constants,
peak_density represents the average pixel population;
hist_avg represents an average of a total pixel population over the number of discrete bins.

12. The process according to claim 10, wherein the adaptive gain is computed based on a peak position factor provided by formula $$\text{peak\_position\_factor} = \begin{cases} (256 - \text{peak\_pos})/128 & \text{peak\_pos} > 128 \\ 1 & 64 \leq \text{peak\_pos} \leq 128 \\ (\text{peak\_pos})/128 + 0.5 & \text{peak\_pos} < 64 \end{cases},$$

wherein peak_pos represents an intensity level of the peak.

13. The process according to claim 10, wherein the adaptive gain is computed based on a peak distribution factor is provided by formula $$\text{peak\_dist\_factor} = \begin{cases} 1 & \text{peak\_dist} \geq \text{hist\_avg} \\ 1.5 - 0.5 \times \text{hist\_avg}/\text{peak\_dist} & \text{hist\_avg} < \text{peak\_dist} < 3 \times \text{hist\_avg} \\ 0 & \text{peak\_dist} \leq 3 \times \text{hist\_avg} \end{cases},$$

where hist_avg represents an average of a total pixel population over the number of discrete bins,
peak_dist represents a sum of pixel populations within a section relative to a width of the section.

14. The process according to claim 1, wherein the transfer curve comprises two opposing banded curves separated by a pivot point that corresponds to the peak.

15. The process according to claim 14, wherein the transfer curve is provided by formulas $$curTC = x + \text{adaptive\_gain} \times (y' - x)$$

$$y' = \begin{cases} \dfrac{c(x)}{c(x_p)} x_p & x \le x_p \\ x_p + (2^n - x_p - 1)\dfrac{c(x) - c(x_p)}{1 - c(x_p)} & x > x_p \end{cases}$$

where, curTC and x represent the input and output pixel brightness intensity respectively, $x_p$ is a peak position of the peak and c(x) and $c(x_p)$ are the cumulative function of x, $x_p$ defined as $$c(x) = \sum_{i=0}^{x} hist_i$$

$$c(x_p) = \sum_{i=0}^{peak\_pos} hist_i$$

where, $hist_i$ is the pixel population at pixel intensity level i.

16. The process according to claim 15, wherein the transfer curve is provided by formulas $$curTC = x + \text{adaptive\_gain} \times (y'' - x)$$

$$y'' = \begin{cases} \dfrac{c(x)}{c(x_p)}(x_p + bbst) - bbst & x \le x_p \\ x_p + (x_{255} - x_p + wbst)\dfrac{c(x) - c(x_p)}{1 - c(x_p)} & x > x_p, \end{cases}$$

$$bbst = \frac{\text{low\_sec\_width}^2}{k_b}$$

$$wbst = \frac{\text{upp\_sec\_width}^2}{k_w},$$

where, curTC and x represent the input and output pixel brightness intensity respectively, $x_p$ is a peak position of the peak and c(x) and $c(x_p)$ are the cumulative function of x, $x_p$ defined as $$c(x) = \sum_{i=0}^{x} hist_i$$

$$c(x_p) = \sum_{i=0}^{peak\_pos} hist_i$$

$hist_i$ is the pixel population at pixel intensity level i.

$k_b$ and $k_w$ are constants upp_sec_width is a count of brightness intensity from the peak to $(2^n-1)^{th}$ brightness intensity, lower_sec_width is a count of brightness intensities from the $0^{th}$ brightness intensity to the peak.

17. The process according to claim 1, wherein the histogram is provided based on an active window of the image.

18. The process according to claim 1, wherein the average pixel population of the peak region is an average of a total pixel population over the number of discrete bins within the peak region.

19. The process according to claim 1, wherein the process is applied on a video comprising video frames of images.

20. The process according to claim 19, wherein computing the smoothened line curve comprises:
   computing a sum of absolute difference (SAD) of the histogram of a current image based on a previous image; and
   performing a SAD weight recursive temporal filtering to the histogram.

21. The process according to claim 19, further comprising:
   computing a SAD of a transfer curve; and
   performing a SAD weighted recursive temporal filtering on the transfer curve.

22. An image processor for enhancing contrast of an image having pixels comprising:
   a histogram generator adapted to generate a histogram in discrete bins, each bin representing a pixel population of at least one pixel brightness intensity;
   a histogram pre-processor adapted to compute a smoothened line curve for the generated histogram;
   a peak analyzer adapted to compute an average pixel population of the histogram, identify a peak and a peak region, and compute an average pixel population of the peak region, wherein the peak region is a range of discrete bins around the peak bounded by intersection of the smoothened line curve with the computed average pixel population of the histogram;
   a pixel distributor adapted to distribute the pixel populations of the discrete bins within the peak region that exceed the average pixel population of the peak region to produce a re-distributed histogram, wherein distributing is limited to the discrete bins within the peak region; and
   a transfer curve generator adapted to generate from the re-distributed histogram a transfer curve for mapping onto the image.

23. The image processor according to claim 22, wherein the histogram has $2^n$ discrete bins, where n is number of bits of the image.

24. The image processor according to claim 22, wherein the histogram is expanded to provide $2^n$ discrete bins when the generated histogram has a number of discrete bins less than $2^n$, where n is number of bits of the image.

25. The image processor according to claim 22, wherein the histogram pre-processor computes the smoothened line curve using a smoothing filter adapted to filter the histogram for avoiding discontinuities of pixel population between successive discrete bins.

26. The image processor according to claim 25, wherein the smoothing filter comprises smoothing factors, and wherein the smoothing filter provides relatively higher smoothing factors at mid level pixel intensities than that of high and low pixel intensities.

27. The image processor according to claim 26, wherein the smoothing filter further comprises a smearing parameter for de-emphasizing the histogram.

28. The image processor according to claim 27, wherein the peak analyzer is adapted to identify the peak, the peak region, and the peak density based on the filtered histogram.

29. The image processor according to claim 22, wherein the pixel distributor is adapted to distribute the pixel populations which exceed the average pixel population of the peak region along two sides of the peak.

30. The image processor according to claim 22, wherein the pixel distributor is adapted to truncate overflows of the distributed pixel population beyond the peak region.

31. The image processor according to claim 22, further comprising an adaptive gain calculator adapted to compute an adaptive gain based on the peak, the peak region and the average pixel population.

32. The image processor according to claim 31, wherein the adaptive gain is computed based on a peak density factor provided by formula $$\text{peak\_density\_factor} = \begin{cases} k_5 \times ((\text{peak\_density}/\text{hist\_avg}) - 1) & \text{peak\_density}/\text{hist\_avg} < 1.5 \\ 1 & 1.5 \leq \text{peak\_density}/\text{hist\_avg} \leq 2 \\ k_6 \times \text{hist\_avg}/\text{peak\_density} & \text{peak\_density}/\text{hist\_avg} > 2 \end{cases}$$

where $k_5$ and $k_6$ are constants,
peak_density represents the average pixel population;
hist_avg represents an average of a total pixel population over the number of discrete bins.

33. The image processor according to claim 31, wherein the adaptive gain is computed based on a peak position factor provided by formula $$\text{peak\_position\_factor} = \begin{cases} (256 - \text{peak\_pos})/128 & \text{peak\_pos} > 128 \\ 1 & 64 \leq \text{peak\_pos} \leq 128 \\ (\text{peak\_pos})/128 + 0.5 & \text{peak\_pos} < 64 \end{cases}$$

wherein peak_pos represents an intensity level of the peak.

34. The image processor according to claim 31, wherein the adaptive gain is computed based on a peak distribution factor is provided by formula $$\text{peak\_dist\_factor} = \begin{cases} 1 & \text{peak\_dist} \geq \text{hist\_avg} \\ 1.5 - 0.5 \times \text{hist\_avg}/\text{peak\_dist} & \text{hist\_avg} < \text{peak\_dist} < 3 \times \text{hist\_avg} \\ 0 & \text{peak\_dist} \leq 3 \times \text{hist\_avg} \end{cases}$$

where hist_avg represents an average of a total pixel population over the number of discrete bins,
peak_dist represents a sum of pixel populations within a section relative to a width of the section.

35. The image processor according to claim 22, wherein the transfer curve comprises two opposing banded curves separated by a pivot point that corresponds to the peak.

36. The image processor according to claim 35, wherein the transfer curve is provided by formulas $$curTC = x + \text{adaptive\_gain} \times (y' - x)$$

$$y' = \begin{cases} \dfrac{c(x)}{c(x_p)} x_p & x \leq x_p \\ x_p + (2^n - x_p - 1)\dfrac{c(x) - c(x_p)}{1 - c(x_p)} & x > x_p \end{cases}$$

where, curTC and x represent the input and output pixel brightness intensity respectively, $x_p$ is a peak position of the peak and $c(x)$ and $c(x_p)$ are the cumulative function of x, $x_p$ defined as $$c(x) = \sum_{i=0}^{x} \text{hist}_i$$

$$c(x_p) = \sum_{i=0}^{\text{peak\_pos}} \text{hist}_i$$

where, $\text{hist}_i$ is the pixel population at pixel intensity level i.

37. The image processor according to claim 36, wherein the transfer curve is provided by formulas $$curTC = x + \text{adaptive\_gain} \times (y'' - x)$$

$$y'' = \begin{cases} \dfrac{c(x)}{c(x_p)}(x_p + bbst) - bbst & x \leq x_p \\ x_p + (x_{255} - x_p + wbst)\dfrac{c(x) - c(x_p)}{1 - c(x_p)} & x > x_p \end{cases}$$

$$bbst = \frac{\text{low\_sec\_width}^2}{k_b}$$

$$wbst = \frac{\text{upp\_sec\_width}^2}{k_w},$$

where, curTC and x represent the input and output pixel brightness intensity respectively, $x_p$ is a peak position of the peak and $c(x)$ and $c(x_p)$ are the cumulative function of x, $x_p$ defined as $$c(x) = \sum_{i=0}^{x} \text{hist}_i$$

$$c(x_p) = \sum_{i=0}^{\text{peak\_pos}} \text{hist}_i$$

$\text{hist}_i$ is the pixel population at pixel intensity level i,
$k_b$ and $k_w$ are constants,
upp_sec_width is a count of brightness intensity from the peak to $(2^n-1)^{th}$ brightness intensity,
lower_sec_width is a count of brightness intensities from the $0^{th}$ brightness intensity to the peak.

38. The image processor according to claim 22, wherein the histogram is provided based on an active window of the image.

39. The image processor according to claim 22, wherein the average pixel population of the peak region is an average of a total pixel population over the number of discrete bins within the peak region.

40. The image processor according to claim 22, wherein the image processor is use for processing a video comprising video frames of images.

41. The image processor according to claim 40, wherein the histogram preprocessor further comprises:
means for computing a sum of absolute difference (SAD) of the histogram of a current image based on a previous image; and
a SAD weight recursive temporal filter for performing a SAD weight recursive temporal filtering to the histogram.

42. The process according to claim 40, further comprising means for computing a SAD of a transfer curve; and
a SAD weight recursive temporal filter for performing a SAD weighted recursive temporal filtering on the transfer curve.

43. A process for enhancing contrast of an image having pixels in different brightness intensities, the process comprising:
generating a histogram in discrete bins, each bin representing a pixel population of at least one pixel brightness intensity;
computing an average pixel population of the histogram;
identifying a peak and a peak region of the histogram, wherein the peak region is a range of discrete bins around the peak defined between a lower bin and an upper bin wherein the pixel population for each of the discrete bins of the peak region exceeds the computed average pixel population of the histogram;
computing an average pixel population of the peak region;
distributing the pixel populations of the discrete bins within the peak region that exceed the average pixel population of the peak region to produce a re-distributed histogram, wherein distributing is limited solely to the discrete bins within the peak region and any excess pixel populations which cannot be distributed to the discrete bins within the peak region are truncated; and
generating a transfer curve for mapping onto the image from the re-distributed histogram.

\* \* \* \* \*